United States Patent Office 3,330,258
Patented July 11, 1967

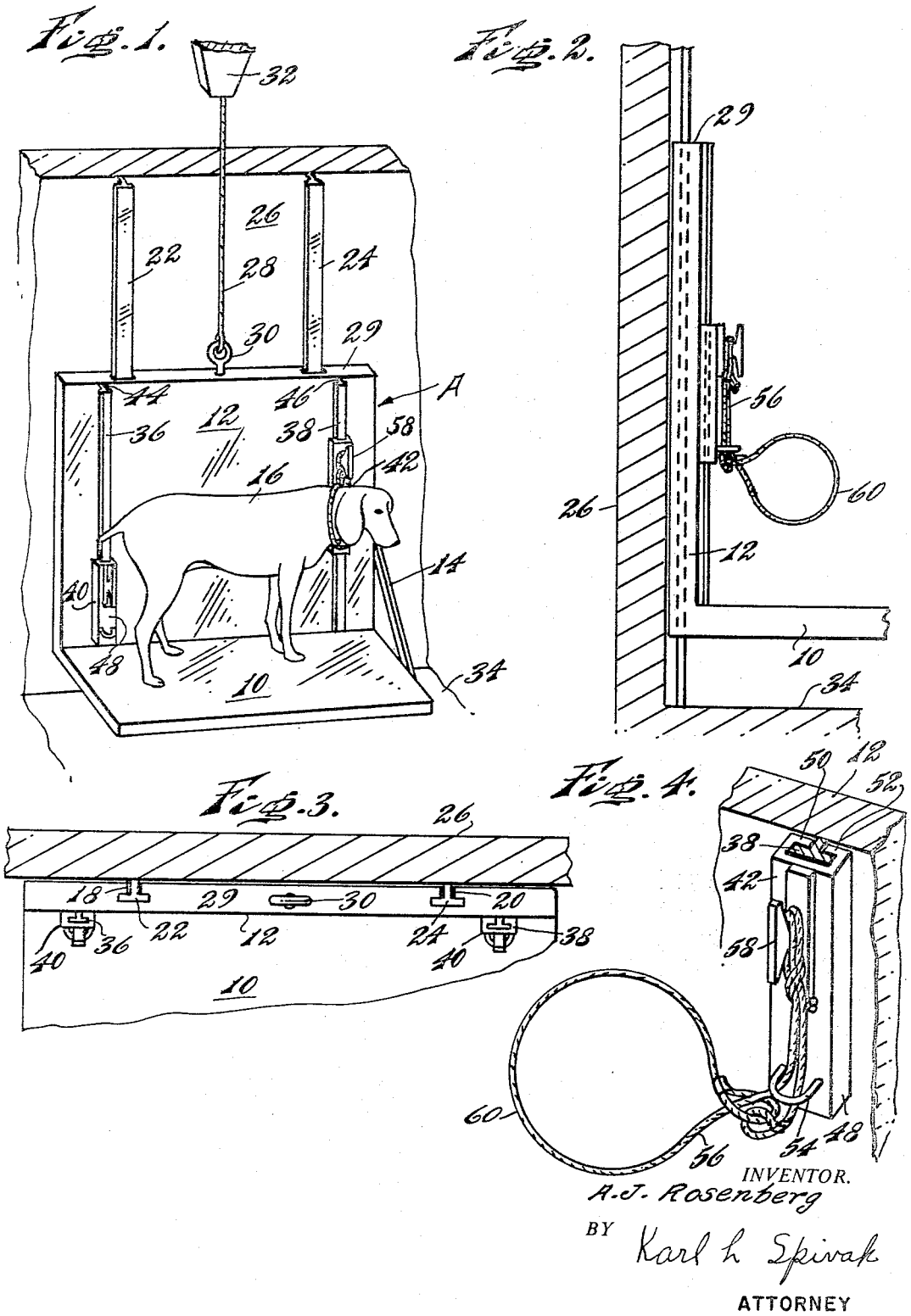

3,330,258
VETERINARY TABLE
Alexander J. Rosenberg, 1006 Edge Hill Road,
Roslyn, Pa. 19001
Filed Oct. 22, 1965, Ser. No. 500,678
3 Claims. (Cl. 119—103)

This invention relates generally to examining tables for animals and is more particularly directed to an elevating platform and back assembly capable of use with both large and small animals.

Veterinarian tables as presently available usually include a horizontal platform for support and incorporate one or more restraining devices to enable the veterinarian to examine or treat an animal while it is held essentially immobile during the procedure. Most prior art tables suffer from the common deficiency of being of fixed height and thus render application for use with a variety of animals of varying sizes rather difficult. It can be readily appreciated that there can be no universally convenient height for the veterinarian to pursue his procedures inasmuch as various animals differ in height and even animals of the same species vary greatly in size.

The problems attendant with fixed tables become especially apparent in cases of animals that are too heavy to lift or to hard to handle due to visciousness or nervousness. Such animals commonly require the presence of at least two men, and even then, the veterinarian is constantly exposed to the risk of harm.

Presently known tables generally provide an animal restraining device that is fixed in position, thereby presenting problems when holding animals of different sizes. In addition, the prior art restraints will not permit holding the animal in either the lying position during certain treatments and also the standing position for manual procedures such as clipping. Further, the presently known fixed type of restraining devices may hold an animal in an uncomfortable or even dangerous position should it happen to fall during the procedure, for example, the animal could hang itself.

It is therefore an object of this invention to provide an improved veterinary table of the type set forth.

It is another object of this invention to provide a novel veterinary table that is vertically adjustable to compensate for the varying heights of the animals to be treated and for the varying heights of veterinarians.

It is another object of this invention to provide a novel veterinary table featuring vertical height adjusting means permitting easy selection of any desired table height from floor level to operating level.

It is another object of this invention to provide a novel veterinary table incorporating restraining means to securely hold an animal to expose either its right side or its left side which can be used with ease and safety.

It is another object of this invention to provide a novel veterinary table equipped with vertically slidable animal restraints designed to automatically adjust according to the height of the animal undergoing treatment.

It is another object of this invention to provide a novel veterinary table equipped with vertically slidable animal restraints designed to automatically hold an animal in either the standing or lying position without tightening or causing other discomfort or permitting the possibility of strangulation.

It is another object of this invention to provide a novel veterinary table featuring unique L-shaped configuration to safely hold an animal for treatment while providing a positive barrier to prevent accidental falling.

It is another object of this invention to provide a novel veterinary table of the elevating type that may be portable or of built-in variety permanently affixed to stationary portions of a building construction.

It is another object of this invention to provide a novel veterinary table that is simple in design, rugged in construction and inexpensive in manufacture.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 1 is a front perspective view of the invention showing a dog in restrained, standing position.

FIG. 2 is an enlarged, partial, side elevational view of the invention.

FIG. 3 is an enlarged, partial, top plan view of the invention.

FIG. 4 is an enlarged, detail, perspective view of a slide restraint in accordance with the instant invention.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 1 an L-shaped veterinary table generally designated A comprising a horizontal platform 10 and a vertical back support 12 attached at right angles thereto to provide a firm rearward construction. Bracing members 14 may be added in any well-known manner to assure rigidity. The back support 12 is constructed generally of a height greater than the depth of the platform 10 both to contain an animal 16 to prevent it from rearwardly falling and to carry slides 18, 20 to accommodate vertical motion of the table A.

As best seen in FIGS. 1 and 3, the back 12 carries a pair of vertical slides 18, 20 which are arranged for sliding engagement upon a pair of spaced tracks 22, 24. The tracks 22, 24 extend in front of a wall 26 or similar vertical construction and are secured thereto in any suitable, firm manner, such as by lag bolts. In order to minimize the forces of friction during movement of the table, I have found it desirable to lubricate the surfaces in contact between the slides and the tracks. If desirable in the interest of ease in operation, other friction reducing means such as rollers, ball bearings, wheels, counterweights and the like may be employed for this purpose and still be within the scope of this invention.

One end of a hoisting cable or rope 28 medially engages the top 29 of the back member 12 and may be secured through an eye-bolt 30 or equivalent construction. The second end of the hoisting cable winds upon the drum of a power hoist 32 which suspends from the ceiling construction (not shown). The tracks 22, 24 and hoisting cable 28 extend sufficiently in length to permit full vertical travel of the table A from floor lever 34 up to any height convenient to the veterinarian during the procedure being undertaken. In such a manner, large or otherwise difficult to handle animals may be led onto the patform 10 while it is on the floor 34 and then the table and animal can be simultaneously raised to the desired height under motor power without requiring any physical effort on the part of the veterinarian. The power hoist 32 may be controlled in any well-known manner such as by foot operated switches or by hand operated switches.

Right and left restraint tracks 36, 38 vertically engage the table back 12 near the edges thereof and extend the full length from the platform 10 to the top 29 and receive a pair of right and left animal restraints 40, 42 in vertical sliding engagement. I have found sail track suitable for this use, but any track and restraint engagement that will permit relatively unrestricted vertical travel of the restraint will prove satisfactory. If desired, a stop 44, 46 such as a set screw or cotter-pin may be employed at the top of each track 36, 38 to prevent the restraints from vertically disengaging.

As best observed in the detailed drawing of FIG. 4, each restraint 40, 42 comprises a body 48 incorporating a pair of rearward vertically extending lugs 50, 52 sized to slidingly engage the vertical tracks 36, 38. A rigid looped keeper 54 projects near the body bottom to receive the animal restraint rope 56 and a cleat 58 protrudes above the loop for rope cinching purposes. The restraints 40, 42 are constructed of a height sufficient to permit the cleat 58 to rise considerably above the animal's head. In this manner, the veterinarian may be assured that he will not be bitten during the rope cinching operation. It will be observed that the restraints 40, 42 will normally slide in the tracks 36, 38 and come to rest against the top of the platform 10 under the influence of the normal gravitational forces when not in use. When an animal 16 is cinched to the restraint 42 as shown in FIG. 1, the restraint will ride in the track 38 and naturally adjust itself to the height most comfortable for the animal. In view of the unrestricted vertical travel of the restraints upon their associated tracks, it can be observed that the restraints will adjust vertically in accordance with the position of the head of the animal undergoing treatment. Thus, larger animals will raise the restraint higher than smaller animals, but all will be as comfortably restrained. Similarly, an animal will be just as easeful in either the standing or reclining positions.

In order to use my invention, the table A is first lowered completely by operating the power hoist controls until the bottom of the platform 10 touches the floor 34. With the table in its lowest position, the rope 56 is formed into a loop 60 and passed over the animal's head. The end of the rope is next inserted through the keeper 54 and the animal can thus be forced onto the table by pulling the rope's end. If the right side of the animal is to be examined or treated, the right restraint 42 should be utilized; if the left side should be exposed, the left restraint 40 is available. When the animal is on the platform, the rope should be inserted through the keeper 54 and then engaged upon the cleat 58. Care should be exercised in the type of rope loop employed to assure that it will neither loosen nor tighten under any efforts exerted by the animal. One suitable loop arrangement is detailed in FIG. 4, but any satisfactory rope arrangement may be employed that will not permit an animal to work itself free nor to injure itself by strangulation.

Once the animal has been secured in position, the entire table may then be raised under hoist power to the desired height. It should be noted that during hoisting operation and subsequently thereto, the vertical back 12 serves to contain the animal and prevent it from falling off of the table. Also, if desired, both restraints may be simultaneously employed at either end of the animal to more securely restrain it. As a modification, the tracks 22, 24 may be secured to an upright, sturdy, portable member that can be mounted above a wheeled base when desired to permit the table to be easily moved from location to location. When constructing this modified version of the veterinary table, I contemplate employing a hydraulic jack of any suitable, well-known variety for table lifting purposes in lieu of the ceiling mounted hoist previously described. In this manner, the table may be rendered completely portable.

Although I have described my invention with a certain degree of particularity, it is understood that the present disclosure has been made only by way of example and that numerous changes in the details of construction and the combination and arrangement of parts may be resorted to without departing from the spirit and scope of the invention as hereafter claimed.

What is claimed is:
1. In a vertically adjustable veterinary table, for securing and lifting animals, the combination of
 a horizontal platform,
  said platform rearwardly joining a vertical back,
   said back rising above the said platform a distance greater than the height of the animals to be secured;
 an animal restraint slidably secured to the said back,
  said restraint having vertical motion relative to the said back and
  said restraint carrying rope securing means;
 a vertical slide affixed to the rear of the said back;
 a track vertically secured to fixed construction,
  said track slidingly engaging the said vertical slide to facilitate vertical movement of the said platform with relation to the said fixed construction; and
 hoist means secured to the said fixed construction,
  said hoist means having a portion thereof attached to the said back,
 whereby the entire platform and back assembly may be raised from the floor to a convenient height for treating an animal.
2. The invention of claim 1 wherein the said restraint carries a rope engaging loop and a rope cinching cleat.
3. The invention of claim 1 wherein the said restraint carries a rope engaging loop and a rope cinching cleat and a rope having one end secured about the neck of the animal to be treated and the second end being passed through the said loop and secured to the said cleat, the said restraint being self adjusting on the said back to a height corresponding the height of the said animal.

References Cited

UNITED STATES PATENTS

| | | | |
|---|---|---|---|
| 504,576 | 9/1893 | Gregory | 187—6 |
| 3,115,211 | 12/1963 | Ostrander | 182—103 |
| 3,208,432 | 9/1965 | Fisk | 119—103 |

FOREIGN PATENTS 222,437   6/1959   Australia.

SAMUEL KOREN, *Primary Examiner.*
HUGH R. CHAMBLEE, *Examiner.*